(12) United States Patent
Liu et al.

(10) Patent No.: US 10,676,639 B2
(45) Date of Patent: Jun. 9, 2020

(54) COLORLESS, TRANSPARENT AND HEAT RESISTANT POLYURETHANE FILMS AND METHODS FOR MANUFACTURING THE SAME

(71) Applicant: Covestro Deutschland AG, Leverkusen (DE)

(72) Inventors: Songlin Liu, Singapore (SG); Nie Yuntong, Singapore (SG); Lena Ouh, Singapore (SG); Rachel Tessy Mathew, Singapore (SG)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/513,737

(22) PCT Filed: Sep. 24, 2015

(86) PCT No.: PCT/EP2015/071928
§ 371 (c)(1),
(2) Date: Mar. 23, 2017

(87) PCT Pub. No.: WO2016/046293
PCT Pub. Date: Mar. 31, 2016

(65) Prior Publication Data
US 2017/0283650 A1 Oct. 5, 2017

(30) Foreign Application Priority Data

Sep. 26, 2014 (EP) .................................... 14186659

(51) Int. Cl.
*C08G 18/10* (2006.01)
*C09D 175/04* (2006.01)
(Continued)

(52) U.S. Cl.
CPC ....... *C09D 175/04* (2013.01); *C08G 18/3212* (2013.01); *C08G 18/3215* (2013.01);
(Continued)

(58) Field of Classification Search
CPC .............. C08G 18/4277; C08G 18/324; C08G 18/3243; C08G 18/4241; C08G 18/792;
(Continued)

(56) References Cited

U.S. PATENT DOCUMENTS

| | | | |
|---|---|---|---|
| 5,939,188 A | 8/1999 | Moncur et al. | |
| 6,284,846 B1 * | 9/2001 | Ambrose | C08G 18/423 |
| | | | 525/124 |

(Continued)

FOREIGN PATENT DOCUMENTS

| | | |
|---|---|---|
| DE | 102008054981 A1 | 7/2009 |
| EP | 2410004 A1 | 1/2012 |

(Continued)

OTHER PUBLICATIONS

JP-2008041808 English Translation, Feb. 2008.*
(Continued)

*Primary Examiner* — Michael L Leonard
(74) *Attorney, Agent, or Firm* — Faegre Drinker Biddle & Reath LLP

(57) ABSTRACT

The present inventions concerns compositions for producing thermoset polyurethanes, comprising polyisocyanates and polyols selected from a list consisting of allicyclic, aromatic compounds and branched polyesters. The films obtained from these compositions exhibit a high transparency, high thermal stability and good chemical resistance, and a method to produce the same. The said polyurethane films can be widely used in electronics industry where high transparency, high thermal resistance and good chemical resistance are the main requirements. Particularly, these
(Continued)

films can be used as the substrates for conductive coatings and barrier coatings. These functionally coated films are particularly useful in applications such as touch panels or photo-voltaic cells.

9 Claims, 1 Drawing Sheet

(51) Int. Cl.
    *C08G 18/79*     (2006.01)
    *C08G 18/32*     (2006.01)
    *C08G 18/38*     (2006.01)
    *C08G 18/42*     (2006.01)
    *H01B 1/08*     (2006.01)

(52) U.S. Cl.
    CPC ..... *C08G 18/3221* (2013.01); *C08G 18/3851* (2013.01); *C08G 18/3872* (2013.01); *C08G 18/4219* (2013.01); *C08G 18/4241* (2013.01); *C08G 18/792* (2013.01); *H01B 1/08* (2013.01); *C08G 18/324* (2013.01); *C08G 18/3243* (2013.01); *C08G 18/4277* (2013.01)

(58) Field of Classification Search
    CPC ............ C08G 18/3221; C08G 18/3851; C08G 18/3872; C09D 175/04
    See application file for complete search history.

(56) References Cited

U.S. PATENT DOCUMENTS

| | | | | |
|---|---|---|---|---|
| 2007/0148471 | A1* | 6/2007 | Rukavina | ............ B32B 17/1077 428/423.1 |
| 2009/0192273 | A1* | 7/2009 | Ichinose | .............. C08G 18/542 525/430 |
| 2010/0273932 | A1* | 10/2010 | Jokisch | .................. C08G 18/10 524/538 |

FOREIGN PATENT DOCUMENTS

| | | | | | |
|---|---|---|---|---|---|
| JP | 2008041808 | A | * | 2/2008 | |
| JP | 2010031163 | A | * | 2/2010 | ............ C08G 18/32 |
| JP | 2014177621 | A | * | 9/2014 | ............ C08G 18/66 |
| KR | 20150037521 | A | | 4/2015 | |

OTHER PUBLICATIONS

JP-2014177621_Sep. 2014_English.*
International Search Report for PCT/EP2015/071928 dated Nov. 16, 2015.
Written Opinion of the International Searching Authority for PCT/EP2015/071928 dated Nov. 16, 2015.

* cited by examiner

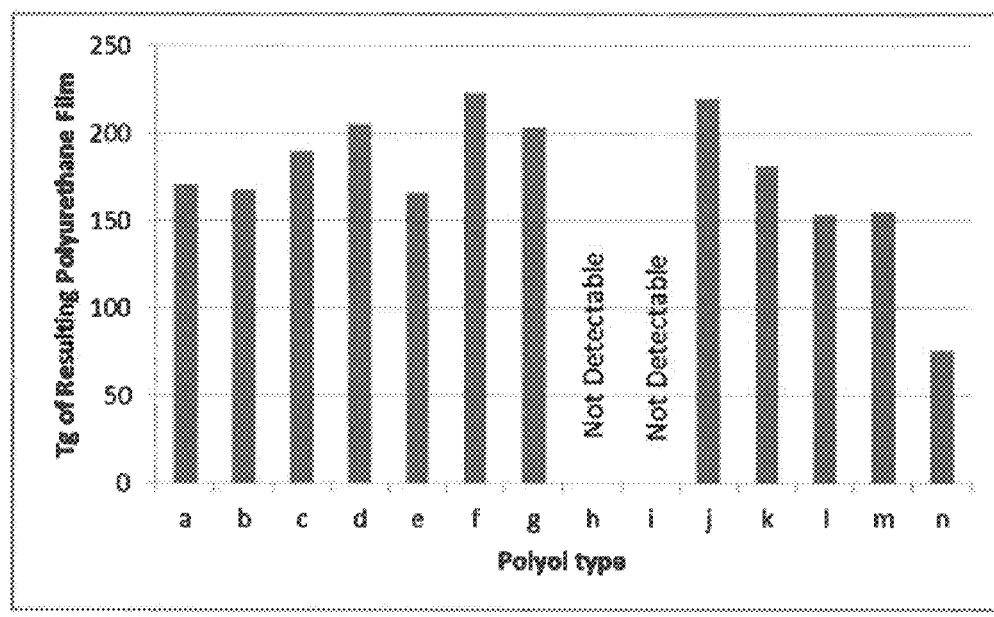

COLORLESS, TRANSPARENT AND HEAT RESISTANT POLYURETHANE FILMS AND METHODS FOR MANUFACTURING THE SAME

CROSS-REFERENCE TO RELATED APPLICATIONS

This application is a national stage application (under 35 U.S.C. § 371) of PCT/EP2015/071928, filed Sep. 24, 2015, which claims benefit of European Application No. 14186659.0, filed Sep. 26, 2014, both of which are incorporated herein by reference in their entirety.

The present inventions concerns polyurethane compositions and their films which exhibit a high transparency, high thermal stability and good chemical resistance, and a method to produce the same. The said polyurethane films can be widely used in electronics industry where high transparency, high thermal resistance and good chemical resistance are the main requirements. Particularly, these films can be used as the substrates for conductive coatings and barrier coatings. These functionally coated films are particularly useful in applications such as touch panels or photo-voltaic cells.

BACKGROUND OF THE INVENTION

EP-A 2410004 discloses a method to produce a transparent antistatic multilayer stack using polyurethane coatings and conductive materials like Indium Tin Oxide (ITO).

DE-A 102008054981 discloses radiation curable polyurethane coating compositions for wood paper, textile leather etc., unlike the current invention which discloses a composition and method to produce a free polyurethane film with desirable properties.

Similarly, U.S. Pat. No. 5,939,188 discloses transparent protective coatings for improving the environmental durability and not a free polyurethane film with desirable mechanical, thermal and optical properties.

Polymeric films have been an indispensable part in flexible electronic devices. They can be part of the displays or part of the touch panels. Desirably, the films exhibit a combination of properties such as flexibility, transparency, color neutrality and resistivity against heat, light and physical and/or chemical stress. Most of these films used are thermoplastic and are manufactured by either melt extrusion or solution casting, depending on their glass transition temperatures (Tg) or melting temperatures (Tm), and thermal stabilities of the polymeric materials. For low glass transition or melting temperature polymers, melt extrusion is the preferred process due to low production cost. For high Tg (Tm) polymers, melt extrusion will result in optical issues in the films because of gel formation at high temperature extrusion process. In addition, melt extruded films often exhibit high optical retardation. Solvent casting is the process used for those materials that melt extrusion is not possible. The cost of solvent casting method is generally higher than the extrusion method. Main transparent plastic films used for electronic industries include polyesters, polycarbonates and cellulous derivatives. All these films have a relatively low glass transition temperature and generally need a coating to improve their chemical resistance. Moreover, a low glass transition temperature limits the scope of application because of the thermal stress included in the coating processes of conductive layers on these films.

BRIEF SUMMARY OF THE INVENTION

Thus, the present invention provides a composition for producing thermoset polyurethanes, comprising isocyanates, and diols and/or triols of compounds selected from a list consisting of alicyclic, aromatic compounds and branched polyesters.

The composition according to the present inventions allows for the production of thermoset polyurethanes such as films, which exhibit a Tg high enough for use of the films as substrates for transparent conductive oxides (TCO). In addition to the Tg, the polyurethanes may exhibit desirable properties such as flexibility, transparency and a certain chemical resistance.

The polyols according to the present invention are preferably compounds exhibiting a certain rigidity, i.e. molecules not having great flexibility. Thus, the polyols according to the present invention are selected from a list consisting of alicyclic and/or aromatic compounds and branched polyesters.

The term "polyol" as used in the present invention has the meaning common in the art, i.e. describing a compound having at least two hydroxy moieties. Thus, the term "polyol" according to the present invention encompasses diols, triols, tetraols and so on.

DETAILED DESCRIPTION OF THE INVENTION

In the following, the present invention will be described in terms of preferred embodiments. The preferred embodiments can be combined freely unless explicitly stated otherwise.

Preferably, the polyols used in the present invention are diols, triols or tetraols, and they are preferably selected from the list consisting of the following compounds (a) to (l)

(a)

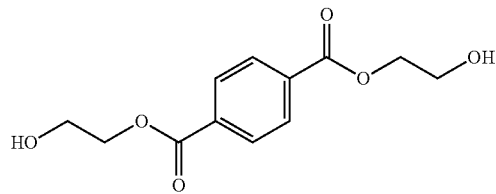 [SMILES: O=C(OCCO)c1ccc(C(=O)OCCO)cc1]

(b)

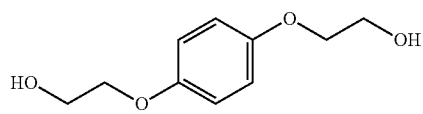 [SMILES: OCCOc1ccc(OCCO)cc1]

(c)

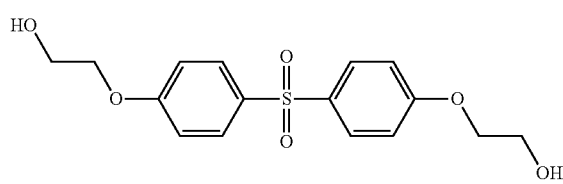 [SMILES: O=S(=O)(c1ccc(OCCO)cc1)c1ccc(OCCO)cc1]

(d)

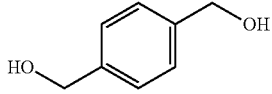

(e)

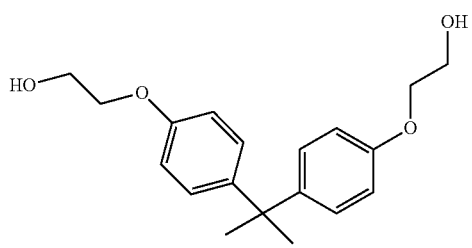 [SMILES: CC(C)(c1ccc(OCCO)cc1)c1ccc(OCCO)cc1]

(f)

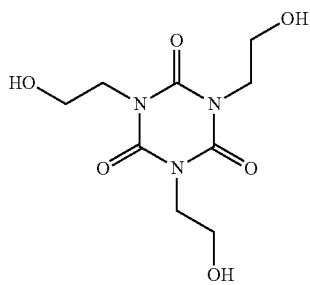 [SMILES: O=c1n(CCO)c(=O)n(CCO)c(=O)n1CCO]

(g)

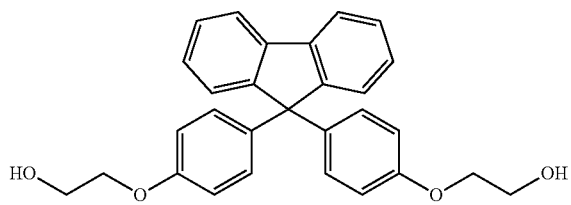 [SMILES: OCCOc1ccc(C2(c3ccc(OCCO)cc3)c3ccccc3-c3ccccc32)cc1]

(h)

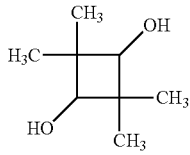

(i)

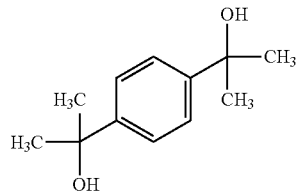

(j)

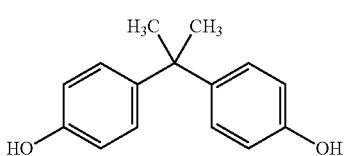 [SMILES: CC(C)(c1ccc(O)cc1)c1ccc(O)cc1]

(k)

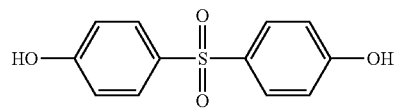

(l) a branched polyester polyol.

Preferably, the polyisocyanate is selected from tetramethylene diisocyanate, hexamethylene diisocyanate, 2-methylpentamethylene diisocyanate, 2,2,4-trimethyl-hexamethylene diisocyanate, dodecanemethylene diisocyanate, 1,4-diisocyanatocyclohexane, 3-isocyanatomethyl-3,3,5-trimethylcyclohexyl isocyanate, 4,4'-diisocyanatodicyclohexylmethane, 4,4'-diisocyanato-3,3'-dimethyldicyclohexylmethane, 4,4'-diisocyanato-2,2-dicyclohexylpropane and their trimers, urethanes, biurets, allophanates or uretdiones.

Particularly preferred is isophorondiisocyanate, and preferably a trimer of isophorondiisocyanate. In particular in combination with at least one of the compounds (a) to (l), polyurethane films having a high Tg can be obtained. In particular, polyurethane films exhibiting desirably high Tgs can be obtained from compositions according to the present invention wherein the polyisocyanate is isophorondiisocyanate, and preferably a trimer of isophorondiisocyanate, and the diol and/or triol is one of compounds (c), (d), (f), (g), (j) and (k).

The composition according to the present invention can easily be transformed into a polyurethane film. Thus, the present invention further provides a polyurethane film, obtained from a composition according to the present invention.

The polyurethane films according to the present invention exhibit a high Tg, which makes them particularly useful in the fabrication of transparent conductive films, e.g. as substrates for the deposition of a transparent conductive film (TCO). TCO films are generally optically transparent and electrically conductive thin layers. For films used as the substrates for transparent conductive oxide coatings (TCO), higher glass transition temperature will allow sputtering of TCO at a higher temperature, thus reducing the electric resistivity of the TCO coatings. Accordingly, it is particularly preferred that the polyurethane films according to the present invention exhibit a Tg according to ASTM D3418 of at least 150° C., more preferred of at least 170° C., particularly preferred of at least 180° C.

With regard to the preparation of the polyurethane film according to the present invention from the composition according to the present invention, it is preferred to cast said composition on a substrate. As method for casting the composition, solvent casting can be mentioned as a suitable method for obtaining the polyurethane in an efficient and effective way. Generally, casting comprises casting the composition onto a carrier substrate to form a coating and then heating the coating. In a preferred exemplary process, the composition is allowed to react at elevated temperatures, preferably in the range of from 40 to 100° C., more preferably in the range of from 50 to 75° C. until an NCO content of lower than 8%, preferably lower than 6% and more preferably lower than 4.5% is achieved. At this point, the composition according to the present invention preferably exhibits a solids content in the range of from 30 to 70 wt.-%, preferably in the range of from 40 to 60 wt.-%. Then, the composition can be casted onto a substrate and subsequently subjected to thermal curing. Thermal curing is preferably carried out stepwise, i.e. gradually rising the temperature over time. For example, a first heating step can be carried out at a temperature in the range of from 40 to 80° C., preferably in the range of from 50 to 70° C. over a period of time in the range of from 15 to 60 min, preferably in the range of from 20 to 40 min, a subsequent heating step can be carried out at a temperature in the range of from 90 to 140° C., preferably in the range of from 100 to 130° C. over a period of time in the range of from to 60 min, preferably in the range of from 20 to 40 min, and a subsequent third heating step can be carried out at a temperature in the range of from 120 to 180° C., preferably in the range of from 130 to 160° C., over a period of time in the range of from 40 to 90 min, preferably in the range of from 50 to 70 min.

Because of the excellent properties of the polyurethane film according to the present invention, it is particularly suited for coating with a transparent conductive film (TCF), in particular when the TCF is deposited on the polyurethane film by sputtering. Particularly suited for the preparation of TCF according to the present invention are transparent conductive oxides (TCO). Thus, the present invention further provides a transparent conductive film, comprising a polyurethane film according to the present invention as a substrate and a transparent conductive oxide layer on said substrate. As TCO materials suitable for the TCF, indium tin oxide (ITO), fluorine doped tin oxide (FTO), doped zinc oxide such as aluminium-doped zinc oxide (AZO) and indium-doped cadmium oxide can be mentioned as preferred embodiments.

Preferably, the transparent conductive oxide layer is deposited by sputtering, metal organic chemical vapor deposition (MOCVD), metal organic molecular beam deposition (MOMBD), spray pyrolysis and pulsed laser deposition (PLD), preferably by sputtering. Sputtering typically encompasses magnetron sputtering. Due to the high Tg of the polyurethane films according, to the present invention, sputtering of TCO can take place at higher temperatures than for comparative polymer, particular polyurethane films, thus reducing the electric resistivity of the TCO coatings. A reduced electric resistivity generally has the effect that applicability in electronic devices is improved.

Hence, a further subject of the present invention is an electronic device, comprising at least one polyurethane film according to the present invention and/or at least one transparent conductive film according to the present invention.

Because of the transparency and flexibility of the inventive films, the electronic device according to the present invention preferably is a display, preferably a touch-panel of a mobile phone, an instrument panel, a touch screen or a photo-voltaic cell.

Accordingly, the present invention further provides a use of the films according to the present invention as substrates for conductive coatings and barrier coatings or as protective films for polarizers in a display.

Hereinafter, the present invention will be explained in detail below with reference to Examples, but the present invention is not limited thereto.

BRIEF DESCRIPTION OF THE DRAWINGS

FIG. 1 shows a graphical rendition of the data summarized in Table 1.

EXAMPLES

Components:
Desmodur® Z4400 (Bayer MaterialScience AG, Leverkusen, Germany), solvent-free, aliphatic polyisocyanate with isocyanurate units based on isophorondiisocyanat, equivalent weight 252 g/Mol.

Desmophen® VP LS 2249/1 (Bayer MaterialScience AG, Leverkusen, Germany), is a solvent-free, branched short-chain, low viscosity polyester polyol.

Desmophen® XP 2488 (Bayer MaterialScience AG, Leverkusen, Germany), is a solvent-free, branched polyester polyol.

Measurements:
1. Glass Transition Temperatures (Tg)

The glass transition temperatures (Tg) of the polyurethanes synthesized were measured according to ASTM D3418 using a Differential Scanning calorimeter (DSC) under nitrogen purge with a heating rate of 10° C./min. The temperature range was from 30 to 300° C. The samples were cooled from 300° C. to 30° C. at a cooling rate of 10° C./min. The transition temperature from the second heating was recorded as the glass transition temperature of the sample.

Example 1

A mixture of 6.72 g of Desmodur® Z4400 from Bayer MaterialScience AG, 3.28 g of bis(2-hydroxyethyl) terephthalate and 10 g of solvent (acetone, methyl ethyl ketone (MEK) or MIBK) was weighted into a four-neck flask with condenser, thermometer and overhead-stirrer and stirred at 60° C. The reaction was continued until the NCO content was lower than 3.5%. The reacted pre-product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The thermoset polyurethane obtained shows a glass transition temperature of 170° C.

Example 2

A mixture of 7.24 g of Desmodur® Z4400 from Bayer MaterialScience AG, 2.76 g of hydroquinone bis(2-hydroxyethyl) ether and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The thermoset polyurethane obtained shows a glass transition temperature of 167° C.

Example 3

A mixture of 6.06 g of Desmodur® Z4400 from Bayer MaterialScience AG, 3.94 g of bis(4-(2-hydroxyethoxy phenyl)sulfone) and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The thermoset polyurethane Obtained shows a glass transition temperature of 189° C.

Example 4

A mixture of 7.90 g of Desmodur® Z4400 from Bayer MaterialScience AG, 2.10 g of 1,4-benzene dimethanol and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The thermoset polyurethane obtained shows a glass transition temperature of 205° C.

Example 5

A mixture of 6.22 g of Desmodur® Z4400 from Bayer MaterialScience AG, 3.78 g of 2,2'-isopropylidene bis(p-phenyleneoxy) diethanol and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The thermoset polyurethane obtained shows a glass transition temperature of 166° C.

Example 6

A mixture of 7.49 g of Desmodur® Z4400 from Bayer MaterialScience AG, 2.51 g of tris(2-hydroxyethyl) isocyanurate and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The thermoset polyurethane obtained shows a glass transition temperature of 223° C.

Example 7

A mixture of 5.42 g of Desmodur® Z4400 from Bayer MaterialScience AG, 4.58 g of 4,4'-(9-fluorenylidene) bis (2-phenoxyethanol) and 10 g of solvent (acetone, MEK or MIBK) was weighted into a four-neck flask with condenser, thermometer and overhead-stirrer and stirred at 60° C. The reaction was continued until the NCO content was lower than 3.5%, The reacted product was a stable, clear liquid having a solid content of ~50%. The reacted solution was then cast onto a substrate material. The cast solution was subjected to thermal curing at 60° C for 30 min, 120° C. for 30 min and 150° C. for 60 min. The thermoset polyurethane obtained shows a glass transition temperature of 203° C.

Example 8

A mixture of 7.83 g of Desmodur® Z4400 from Bayer MaterialScience AG, 2.17 g of 2,2,4,4-tetramethyl-1,3-cyclobutanediol and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The glass transition temperature of the thermoset polyurethane obtained is not detectable.

Example 9

A mixture of 7.28 g of Desmodur® Z4400 from Bayer MaterialScience AG, 2.72 g of 1,4-bis(alpha-hydroxy isopropyl) benzene and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The glass transition temperature of the thermoset polyurethane obtained is not detectable.

Example 10

A mixture of 6.95 g of Desmodur® Z4400 from Bayer MaterialScience AG, 3.05 g of bisphenol-A and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The glass transition temperature of the thermoset polyurethane obtained is 220° C.

Example 11

A mixture of 6.75 g of Desmodur® Z4400 from Bayer MaterialScience AG, 3.25 g of bisphenol-S and 10 g of solvent (acetone, MEK or MIBK) was weighted into a four-neck flask with condenser, thermometer and overhead-stirrer and stirred at 60° C. The reaction was continued until the NCO content was lower than 3.5%. The reacted product was a stable, clear liquid having a solid content of ~50%. The reacted solution was then cast onto a substrate material. The cast solution was subjected to thermal curing at 60° C. for 30 min, 120° C. for 30 min and 150° C. for 60 min. The glass transition temperature of the thermoset polyurethane obtained is 181.5° C.

Example 12

A mixture of 19.31 of Desmodur® Z4400 from Bayer MaterialScience AG, 7.68 g of Desmophen® VPLS 2249/1 from Bayer MaterialScience AG and 12 g of solvent (acetone, MEK or MIBK) was weighted into a four-neck flask with condenser, thermometer and overhead-stirrer and stirred at 60° C. The reaction was continued until the NCO content was lower than 3.5%. The reacted solution was then cast onto a substrate material. The cast solution was subjected to thermal curing at 60° C. for 30 min, 120° C. for 30 min and 150° C. for 60 min. The glass transition temperature of the thermoset polyurethane obtained is 153.3° C.

Example 13

A mixture of 17.32 g of Desmodur® Z4400 from Bayer MaterialScience AG, 6.68 g of Desmophen® XP 2488 from Bayer MaterialScience AG and 12 g of solvent (acetone, MEK or MIBKg) was weighted into a four-neck flask with condenser, thermometer and overhead-stirrer and stirred at 60° C. The reaction was continued until the NCO content was lower than 3.5%. The reacted solution was then cast onto a substrate material. The cast solution was subjected to thermal curing at 60° C. for 30 min, 120° C. for 30 min and 150° C. for 60 min. The glass transition temperature of the thermoset polyurethane obtained is 154.6° C.

The resulting Tg obtained in the above examples are summarized in table 1.

Comparative example 1: Films similar to those described in previous examples were made out of polycaprolactonetriol and Desmodur® XP2489 (an aliphatic polyisocyanate) in a ratio of 35 to 65.

The cast solution was subjected to thermal curing at 60° C. for 30 min, 120° C. for 30 min and 150° C. for 60 min. The glass transition temperature of the thermoset polyurethane obtained is 75° C.

TABLE 1

Glass transition temperatures of polyurethanes derived from Desmodur® Z4400 with different polyols

| Polyol Code | Name of Polyol | $T_g$, ° C. |
|---|---|---|
| a | Bis(2-hydroxyethyl) terephthalate | 170.4 |
| b | Hydroquinone bis(2-hydroxyethyl) ether | 167.7 |
| c | Bis(4-(2-hydroxyethoxy phenyl) sulfone) | 189.9 |
| d | 1,4-Benzenedimethanol | 205.7 |
| e | 2,2'-isopropylidene bis(p-phenyleneox) diethanol | 166.1 |
| f | Tris(2-hydroxyethyl) Isocyanurate | 223.1 |
| g | 4,4'-(9-fluorenylidene) bis(2-phenoxyethanol) | 203.4 |
| h | 2,2,4,4-tetramethyl-1,3-cyclobutanediol | Not detectable |
| i | 1,4-bis(alpha-hydroxy isopropyl) benzene | Not detectable |
| j | Bisphenol-A | 220.0 |
| k | Bisphenol-S | 181.5 |
| l | Desmophen® VPLS 2249/1 | 153.3 |
| m | Desmophen® XP 2488 | 154.6 |
| n | Polycaprolactonetriol | 75 |

The invention claimed is:

1. A transparent conductive film, comprising a polyurethane film obtained from a composition, comprising polyisocyanates and polyols, wherein the polyol is one of compounds (c) or (g),

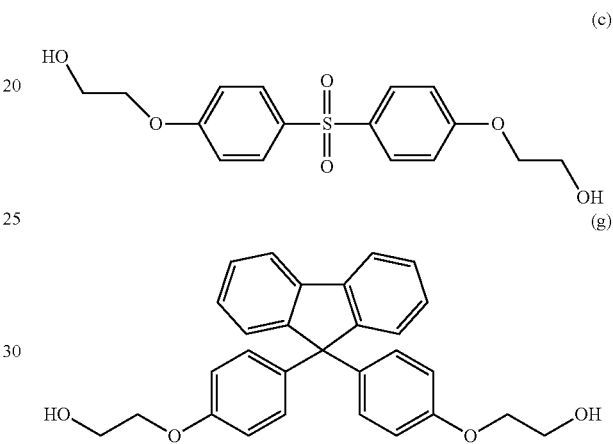

and wherein the polyisocyanate is a trimer of isophorondiisocyanate,
as a substrate and a transparent conductive oxide layer selected from the group consisting of indium tin oxide, fluorine doped tin oxide, doped zinc oxide such as aluminium-doped zinc oxide, indium-doped cadmium oxide and antimony tin oxide on said substrate.

2. The transparent conductive film of claim 1, wherein the polyurethane film has a glass transition temperature Tg according to ASTM D3418 of at least 150° C.

3. The transparent conductive film of claim 1, wherein the polyurethane film has a glass transition temperature Tg according to ASTM D3418 is at least 170° C.

4. The transparent conductive film of claim 1, wherein the polyurethane film is obtained by casting said composition onto a carrier substrate.

5. The transparent conductive film according to claim 1, wherein the transparent conductive oxide layer is deposited by sputtering, metal organic chemical vapor deposition, metal organic molecular beam deposition, spray pyrolysis and pulsed laser deposition.

6. An electronic device, comprising at least one transparent conductive film according to claim 1.

7. The electronic device according to claim 6, wherein the device is a display, an instrument panel, or a photo-voltaic cell.

8. The transparent conductive film of claim 1, wherein the polyol is compounds (c).

9. The transparent conductive film of claim 1, wherein the polyol is compounds (g).

* * * * *